Nov. 21, 1967      C. H. SMALE      3,353,551
AIR BY-PASS ARRANGEMENT OPERATED BY DIFFERENTIAL AIR PRESSURE
Filed Aug. 5, 1965      2 Sheets-Sheet 1
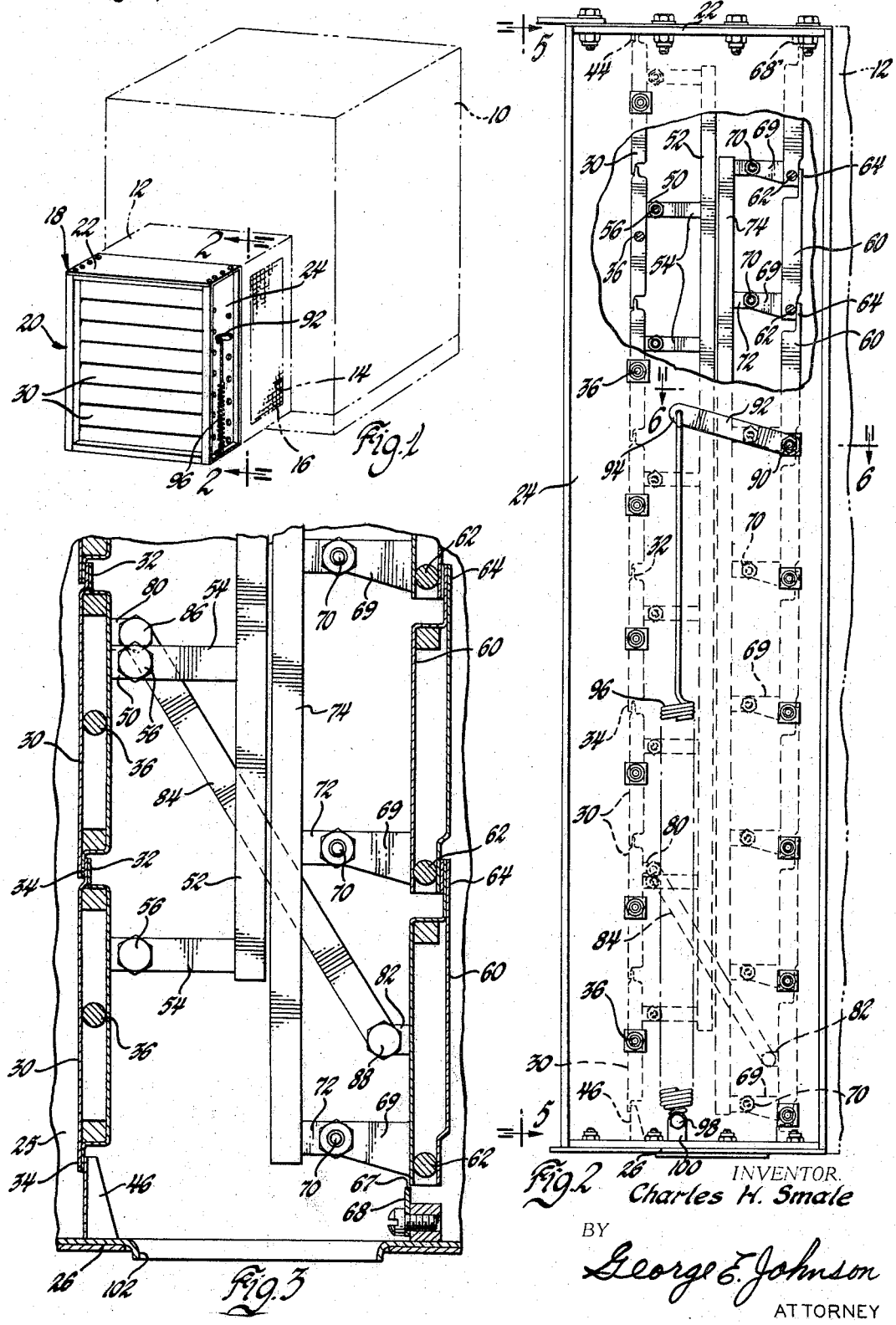
INVENTOR.
Charles H. Smale
BY
George E. Johnson
ATTORNEY Nov. 21, 1967  C. H. SMALE  3,353,551
AIR BY-PASS ARRANGEMENT OPERATED BY DIFFERENTIAL AIR PRESSURE
Filed Aug. 5, 1965  2 Sheets-Sheet 2
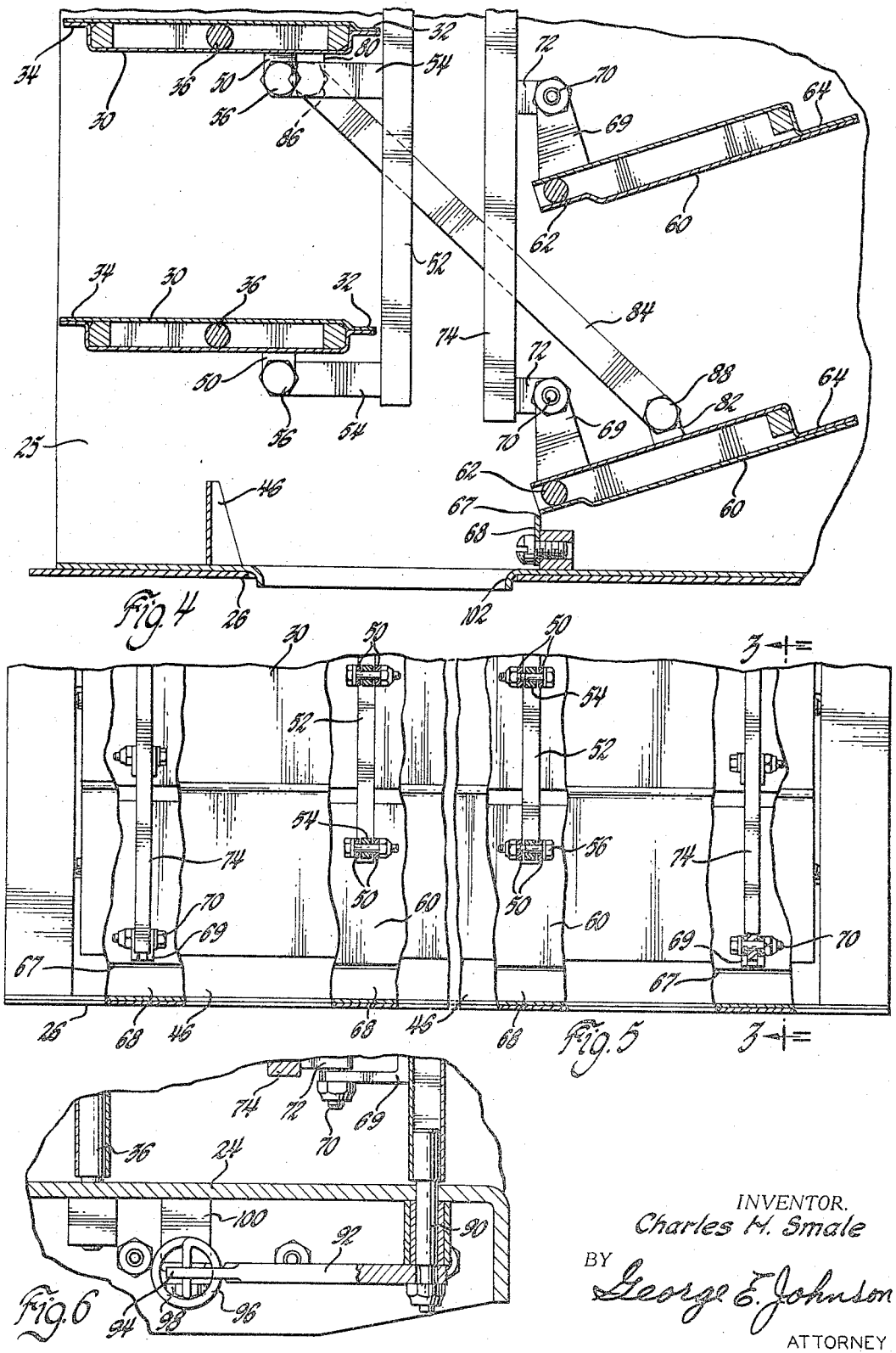
INVENTOR.
Charles H. Smale
BY George E. Johnson
ATTORNEY

United States Patent Office 3,353,551
Patented Nov. 21, 1967

3,353,551
AIR BY-PASS ARRANGEMENT OPERATED BY DIFFERENTIAL AIR PRESSURE
Charles H. Smale, Indianapolis, Ind., assignor to General Motors Corporation, Detroit, Mich., a corporation of Delaware
Filed Aug. 5, 1965, Ser. No. 477,466
6 Claims. (Cl. 137—114)

The invention described herein was made in the course of, or under, a contract with the United States Atomic Energy Commission.

This invention pertains to by-pass arrangements suitable for use with air filters or other devices subject to flow impedance and consequent loss of air supplied to apparatus being served by the filter or other device and requiring such a supply.

Often an apparatus or a machine requires a flow of air which must be filtered or otherwise treated and in the event that the flow of air is impeded by blockage in the filter or other device, it is necessary that ambient or untreated air be supplied from some other zone or source at least for a period of time until the situation causing the impediment be alleviated. If the apparatus is installed in the open air, it is essential that the by-pass arrangement be not influenced by wind currents or localized ambient air pressure variation to prevent ingestion of air borne debris except in emergencies.

An object of the present invention is to provide a by-pass arrangement for an air flow device, which arrangement is sensitive to the air flow conditions within the device and which is not affected in its operation by ambient air pressure conditions.

A feature of the present invention is a housing having opposed doors at least one of which is balanced insofar as air pressure outside the housing is concerned and at least another which is unbalanced insofar as air flow in the apparatus being served is concerned, the doors being linked together for simultaneous opening or closing and adapted to be held closed until the required conditions in the normal air path cease to obtain.

These and other important features of the invention will now be described in detail in the specification and then pointed out more particularly in the appended claims.

In the drawings:

FIGURE 1 is a perspective view of apparatus including an air filter device associated with a machine being served by the filter and to which filter device the by-pass arrangement of the present invention is affixed;

FIGURE 2 is an enlarged side view of the by-pass arrangement with a portion of an enclosing housing broken away and the view being in the direction of the arrows 2—2 in FIGURE 1;

FIGURE 3 is a sectional view looking in the direction of the arrows 3—3 in FIGURE 5 and with doors in their closed positions;

FIGURE 4 is a view similar to that of FIGURE 3 but with doors in their open positions;

FIGURE 5 is a part sectional view looking in the direction of the arrows 5—5 in FIGURE 2; and FIGURE 6 is an enlarged sectional view looking in the direction of the arrows 6—6 in FIGURE 2.

In FIGURE 1, an apparatus or machine is depicted at 10 by dot and dash lines. This machine is not a part of the present invention but it will be understood that it requires a certain flow of filtered air for its proper or optimum operation. This apparatus could be an air breathing turbine engine or some other device and a description thereof is not set forth herein as the apparatus 10 forms no part of the present invention. Attached to one side of the apparatus 10 is a four-sided casing 12 one side of which bears an opening 14 traversed by an air filter material 16. It will be understood that normally air enters through the filter material 16 and then passes from the casing 12 into the apparatus 10. The filter and its housing 12 also forms no part of the present invention. What concerns us in visualizing the present invention is that when the filter material 16 becomes clogged, it is necessary, temporarily at least, for air to pass around the filter material 16 and through the casing 12 into the machine 10 without being influenced by ambient conditions.

The subject matter of the present invention resides in the by-pass arrangement generally indicated at 18 in FIGURE 1. This arrangement 18 comprises a housing 20 having a top wall 22, two opposed side walls 24 and 25, and a bottom wall 26.

An outside wall of the housing 20 is substantially composed of a series of doors 30. Each of these doors is double walled and is fitted with a top flange 32 and a bottom flange 34 in such a way that each flange of one door will overlap a flange of an adjacent door when the doors are in a closed position as seen in FIGURE 3. Each of these doors is pivoted on a transverse shaft 36 mounted for rotation on the side walls 24 and 25 of the housing 20. The top door 30 is adapted to overlap a depending flange 44 (FIGURE 2) fixed to the top wall 22. The bottom door 30 is adapted to overlap a horizontal member 46 fixed to the bottom wall 26. Two spaced brackets 50 are fixed to each door 30 midway between its shaft 36 and its top flange 32. Two vertical rods 52 are retained within the housing 20 and have horizontal arms 54 (two for each door 30) and the arrangement is such that a bolt 56 serves as a pivot or journal between a bracket 50 and an arm 54. The two rods 52 thereby serve as links connecting all the outside doors 30 for simultaneous operation about their respective axes or shafts 36.

Opposed to the doors 30 is a second set of doors each door 60 of which is pivoted near its bottom upon a horizontal shaft 62. A flange 64 at the top of each door is adapted to overlap an adjacent door or a depending projection 68' at the top of a housing 20 when the doors are in their closed positions. A clearance 67 is made near the bottom of and between a horizontal plate 68 of the housing 20 and the lowest door 60 to permit swinging of the latter.

Each door 60 is double walled, each bears two spaced brackets 69 and the end of each of these is pivotally connected by means of a bolt 70 to a shorter arm 72 extending horizontally from one of two spaced vertical rods 74. Because of the brackets 69 and the pivoted or bolt connections between the latter and the vertical rods 74 the doors 60 are operationally linked together for simultaneous opening or closing.

The next to the outside bottom door 30 is provided with a bracket 80 and the lowest inside door 60 is provided with a bracket 82. The bracket 80 is connected to the bracket 82 by an inclined link 84 and pivot bolts 86 and 88. The link 84 serves to connect the sets of doors 30 and 60 for simultaneous operation.

It will be noted that each door 30 is balanced against exterior or ambient air pressure as its shaft 36 is midway its height. In the case of the doors 60, however, each door 60 is unbalanced and sensitive to differential air pressure exerted thereon.

One of the shafts 62 bears an extension 90 which extends through the wall 24 and is nonrotatively held with relation to a crank arm 92. A free end 94 of the arm is pivotally connected to one end of a spring 96. The other end of the latter is attached by means of a bolt 98 and a bracket 100 to an exterior base portion of the housing 20. The spring 96 is under tension thereby tending to hold all the doors 60 and 30 in their closed positions.

The bottom wall 26 of the housing 20 bears an opening 102 and is spaced above the ground, floor or structure beneath it to give a quiescent or sheltered zone from which air pressure may be availed of that is substantially unaffected by localized air currents.

Assuming that the apparatus 10 is working normally, a required supply of air passes through the filter, into the casing 12 and then into the apparatus 10. Clogging of the filter material 16 will ultimately occur and this induces a drop in pressure in the casing 12 and a change in the differential pressure affecting the inner doors 60. This change will finally reach an extent causing the doors 60 to open against the predetermined loading of the spring 96 and, as the outer doors 30 are linked to the doors 60, the doors 30 will also open and ambient air will be admitted through both sets of doors to the casing 12 and the apparatus 10.

The clearance 67 (FIGURE 3) beneath the lowest door 60 is small and does not adversely affect the operation in a large installation. It will be appreciated, however, that sealing means such as rubber flaps may be used to close the clearance 67 and also at the sides of each door 30 or 60 to eliminate any objectionable leakage.

A single door could be used in place of each series of doors but the use of multiple doors is preferred as it reduces the operative envelope or casing required.

I claim:

1. An outdoor air by-pass arrangement suitable for by-passing a device such as an air filter, said by-pass arrangement comprising a housing, opposite and parallel walls of said housing including two sets of doors, one of said sets of doors being in one of said walls to constitute outer doors, the other of said sets of doors being in the other of said walls to constitute inner doors adapted to serve downstream of said device, each door of said one set of outer doors being pivotally mounted and balanced as to a first differential air pressure exerted against it, each door of said other set of inner doors being pivotally mounted and unbalanced as to a second differential air pressure exerted against it, means urging said inner doors toward their closed positions with a predetermined force, an opening in said housing connecting a zone between said door sets to a sheltered ambient air zone, and means linking the doors of said door sets together for simultaneous operation when said predetermined force is overcome by said second differential air pressure.

2. An outdoor air by-pass arrangement comprising a housing, opposed walls of said housing each including a set of doors, each door of one of said sets being pivotally mounted and balanced as to a first differential air pressure exerted against it, each door of the other of said sets being pivotally mounted and unbalanced as to a second differential air pressure exerted against it, means connected to and resiliently urging all of said doors toward their closed positions, an opening in said housing connecting a zone between said door sets to a sheltered ambient air zone, and the arrangement being such that an increase in said second differential pressure is adapted to open all of said doors.

3. An outdoor air by-pass arrangement comprising a housing, opposed doors in said housing, one of said doors being pivotally mounted and balanced as to a first differential air pressure exerted against it, the other of said doors being pivotally mounted and unbalanced as to a second differential air pressure exerted against it, spring means linked to said doors urging them toward their closed positions, an opening in said housing connecting a zone between said doors to a sheltered ambient air zone, and the arrangement being such that an increase in said second differential air pressure is adapted to open said doors against the action of said spring means.

4. An air by-pass arrangement comprising a housing, opposed doors in said housing controlling the flow of ambient air through said housing, each of said doors being pivotally mounted, one of said doors being balanced against air pressure outside said housing, the other of said doors being unbalanced as to air pressure exerted against it, spring means urging said doors to their closed positions, linkage means connecting said doors for simultaneous operation, an opening in said housing connecting a zone between said doors and an air zone outside said housing and away from said one door, and the arrangement being such that a change in air pressure exerted against said other door is adapted to open the latter against said spring means and simultaneously open the said one door through said linkage means.

5. An air by-pass arrangement as set forth in claim 4, said one door being one of a set of doors forming a substantial part of a wall of said housing, said other door being one of a set of doors forming a substantial part of another wall of said housing, said linkage means operatively connecting all of said doors, and said opening being in a third wall of said housing.

6. A by-pass arrangement for air comprising a housing, two pivotally mounted doors in said housing, one of said doors being balanced against air pressure outside said housing, the other of said doors being unbalanced as to air pressure exerted against it, means urging said doors to their closed positions, linkage means connecting said doors for simultaneous operation, an opening in said housing connecting a zone between said doors and an air zone outside said housing and away from said one door, and the arrangement being such that a change in air pressure exerted against said other door is adapted to open the latter against said door urging means and simultaneously open the said one door through said linkage means.

No references cited.

WILLIAM F. O'DEA, *Primary Examiner.*

D. J. ZOBKIW, *Assistant Examiner.*